(No Model.)
W. L. LYMAN.
COMPOUND FOR CLOSING PUNCTURES IN PNEUMATIC TIRES.
No. 587,982. Patented Aug. 10, 1897.
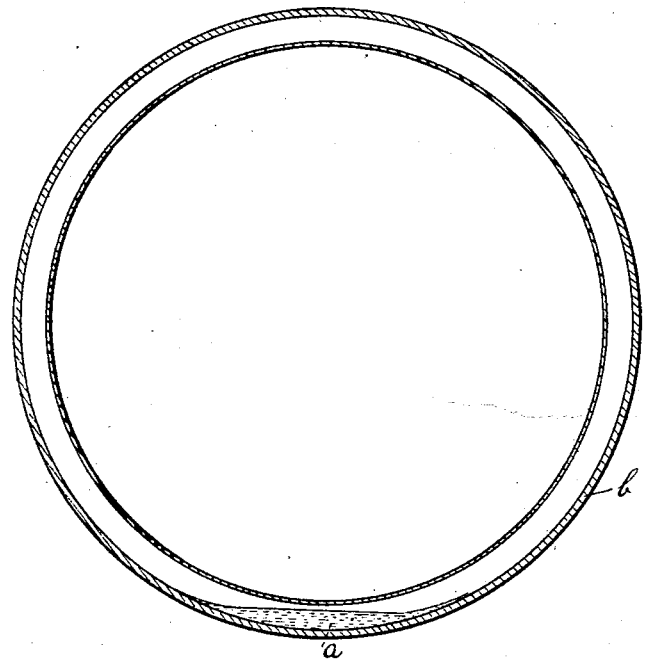
WITNESSES:
INVENTOR
William L. Lyman
BY
his ATTORNEYS

UNITED STATES PATENT OFFICE.

WILLIAM L. LYMAN, OF EAGLE PASS, TEXAS.

COMPOUND FOR CLOSING PUNCTURES IN PNEUMATIC TIRES.

SPECIFICATION forming part of Letters Patent No. 587,982, dated August 10, 1897.

Application filed October 11, 1895. Serial No. 565,384. (No specimens.)

*To all whom it may concern:*

Be it known that I, WILLIAM L. LYMAN, of Eagle Pass, in the county of Maverick and State of Texas, have invented a certain new and useful Compound for Closing Punctures in Pneumatic Tires; and I do hereby declare the following to be a full, clear, and exact description of the invention, such as will enable others skilled in the art to which it pertains to make and use the same.

My invention relates to a liquid compound for closing punctures in inflated wheel-tires.

The ingredients of which the compound is composed are boracic acid, dextrine, gelatin, gum-arabic, gum-mesquit, caramel, and water. For about one quart of compound I prefer to use five grains of boracic acid, one ounce of dextrine, one ounce of gelatin, one ounce of gum-arabic, seven ounces of gum-mesquit, one-quarter ounce of caramel, and sixteen ounces of soft water. I mix the ingredients in a quart-bottle and then let the compound stand for twenty-four or thirty-six hours until all the ingredients are dissolved, whereupon the liquid is strained, after which it is ready for use.

The application of liquid is as follows: The liquid is injected into the tire by means of a syringe through the valved hole with which the tire is provided. A pump can be used in place of a syringe. I would recommend the injection of three ounces of the fluid into a tire, and the valve is then replaced and the tire inflated to its fullest extent, whereupon the wheel to which the tire is attached is turned round three or four times to afford a good chance for the liquid to cover the internal surfaces of the tubular tire. When the tire receives a puncture, the force or pressure of air within the tire drives the fluid that the tire contains into the puncture, and the fluid thus driven into the puncture closes the puncture.

The fluid is not volatile, and hence it will remain in a fluid form nine or ten months, and the fluid, should it become too thick, can be brought to the proper state by adding thereto one or two ounces of water.

I would here remark that the proportions of the ingredients of the compound may be varied more or less without departing from the spirit and purpose of my invention that comprises, broadly, a compound composed of boracic acid, dextrine, gelatin, gum-arabic, gum-mesquit, caramel, and suitable water, mixed in approximately the proportions specified. I would also remark that a good compound suitable for closing minute or small punctures is formed by the substitution of a suitable gummy substance—such, for instance, as gum-arabic, dextrine, gelatin, and gum-mesquit—for the gummy elements included in the compound hereinbefore described.

My improved liquid compound is elastic after drying, will assist in the preservation of the tire, and prevents the tire from hardening. It does not stick to metal, and hence will not stick or gum valves. Although the compound dries and hardens to a certain extent upon its exposure to atmosphere and light, the process of drying is very slow as long as the compound is confined in darkness within the chamber in the tire; but the elasticity of the compound after drying prevents cracking of the dried compound entering a puncture and renders the compound particularly well adapted for the work indicated.

The accompanying drawing shows a quantity of the compound *a* within an inflated tire *b*, that is shown in central section.

What I claim is—

1. A compound consisting of the following ingredients and proportions: five grains of boracic acid, one-quarter ounce caramel, sixteen ounces water, and ten ounces of a gummy substance, such, for instance, as dextrine, gelatin, gum-arabic and gum-mesquit.

2. A compound composed of boracic acid, dextrine, gelatin, gum-arabic, gum-mesquit, caramel and suitable water, approximately in the proportions specified.

In testimony whereof I sign this specification, in the presence of two witnesses, this 18th day of September, 1895.

WILLIAM L. LYMAN.

Witnesses:
  W. A. MITCHELL,
  C. D. HARTUP.